(12) United States Patent
Meyer et al.

(10) Patent No.: US 6,310,150 B1
(45) Date of Patent: Oct. 30, 2001

(54) SUPPORTED OLEFIN POLYMERIZATION CATALYSTS

(75) Inventors: Karen E. Meyer, Cincinnati; Mark K. Reinking, Mason, both of OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/879,443

(22) Filed: Jun. 12, 2001

Related U.S. Application Data

(62) Division of application No. 09/443,711, filed on Nov. 19, 1999, now Pat. No. 6,281,155.

(51) Int. Cl.$^7$ .................................................. C08F 4/44
(52) U.S. Cl. ....................... 526/133; 526/120; 526/121; 526/131; 526/132; 526/348.2; 526/348.5; 526/348.6; 502/202
(58) Field of Search ..................... 526/120, 121, 526/131, 132, 133, 348.2, 348.5, 348.6; 502/202

(56) References Cited

U.S. PATENT DOCUMENTS

| | | |
|---|---|---|
| 3,422,049 | 1/1969 | McClain . |
| 3,432,483 | 3/1969 | Peoples et al. . |
| 3,746,681 | 7/1973 | McClain . |
| 3,925,338 | 12/1975 | Ort . |
| 4,098,979 | 7/1978 | Maemoto et al. . |
| 4,268,418 | 5/1981 | Hoff . |
| 4,404,343 | 9/1983 | Hoff . |
| 4,921,825 | 5/1990 | Kioka et al. . |
| 5,126,301 | 6/1992 | Tsutsui et al. . |
| 5,153,157 | 10/1992 | Hlatky et al. . |
| 5,198,401 | 3/1993 | Turner et al. . |
| 5,241,025 | 8/1993 | Hlatky et al. . |
| 5,272,536 | 12/1993 | Fumihiko et al. . |
| 5,346,925 | 9/1994 | Toshihiko et al. . |
| 5,409,875 | 4/1995 | Hsu . |
| 5,492,985 | 2/1996 | Peifer et al. . |
| 5,539,124 | 7/1996 | Etherton et al. . |
| 5,554,775 | 9/1996 | Krishnamurti et al. . |
| 5,587,439 | 12/1996 | DiMaio . |
| 5,637,660 | 6/1997 | Nagy et al. . |
| 5,852,146 * | 12/1998 | Reichle et al. ............... 526/172 |

FOREIGN PATENT DOCUMENTS

| | | |
|---|---|---|
| 0 279 863 A1 | 8/1988 | (EP) . |
| 0 563 917 A1 | 3/1993 | (EP) . |
| WO 96/34021 * | 10/1996 | (WO) . |

* cited by examiner

*Primary Examiner*—David W. Wu
*Assistant Examiner*—William K Cheung
(74) *Attorney, Agent, or Firm*—Gerald A. Baracka; Jonathan L. Schuchardt

(57) ABSTRACT

Supported heterometallocene catalysts wherein the support is a particulate polymeric material are provided. The catalysts have a transition metal complex containing at least one anionic, polymerization stable heteroatomic ligand associated with the transition metal and a boron activator compound deposited on the support. Polymeric supports used for the heterometallocene catalysts of the invention are homopolymers of ethylene and copolymers of ethylene and $C_{3-8}$ α-olefins.

5 Claims, No Drawings

SUPPORTED OLEFIN POLYMERIZATION CATALYSTS

This is a division of application Ser. No. 09/433,711, filed Nov. 19, 199, now U.S. Pat. No. 6,281,155.

BACKGROUND OF THE INVENTION

1. Field of the Invention

The invention relates to polymer supported transition metal catalysts useful for the polymerization of olefins. More specifically, the catalysts are supported heterometallocenes and comprise a transition metal coordination complex having at least one anionic, polymerization-stable heteroatomic ligand and a boron compound activator on a particulate polymer support. The polymeric supports are ethylene homopolymers and copolymers of ethylene and $C_{3-8}$ α-olefins.

2. Description of the Prior Art

The ability of metallocene catalysts to produce polyolefin resins of narrow molecular weight distribution (MWD), low extractables and uniform comonomer incorporation has spurred activity with these and other single-site catalyst systems. As used herein, single-site catalysts refer to transition-metal catalysts having one or more polymerization-stable cyclopentadienyl (Cp) ligands, Cp derivative ligands, heteroaromatic ligands or constrain-inducing ligands associated with the transition metal and which, when used to polymerize α-olefins, produce resins having the characteristic narrow MWD ($M_w/M_n$).

While single-site catalysts have been incorporated on supports for use in gas phase, slurry and related processes, reactor fouling and/or sheeting and reduced activity are problems. Fouling results in poor heat transfer, poor polymer morphology and, in extreme circumstances, can force reactor shutdown. Numerous procedures have been proposed to reduce reactor fouling and sheeting. For example, electrical methods have been proposed to control static electricity and antistatic agents have been included in the polymerization for this purpose. Surface treatments of the interior walls of polymerization vessels have also been employed. Various other techniques, such as the use of surface modifiers for the support material used, have also been utilized during catalyst preparation.

New supported single-site catalyst systems capable of reducing polymer stickiness and eliminating or minimizing reactor fouling are constantly being sought particularly, if the catalysts are derived from readily available and economical materials and if catalyst is not adversely affected. These and other objectives are achieved with the supported catalysts of the invention wherein a heterometallocene catalyst and boron compound are supported on a particulate polyethylene resin.

The use of polymer supports with Ziegler-Natta catalysts is known. For example, in U.S. Pat. No. 3,925,338 Ziegler-Natta catalysts are deposited on different particle size polyethylene supports to control the particle size in gas phase polymerizations. The use of vanadium catalysts supported on various speroidal high molecular weight polymers is disclosed in U.S. Pat. No. 4,098,979. Hoff, in U.S. Pat. Nos. 4,268,418 and 4,404,343 discloses the use of polymeric carriers, preferably containing a small amount of polar groups, as catalyst support. Carboxyl group-containing polymers modified with magnesium are used to support polymerization catalysts in U.S. Pat. No. 5,409,875.

Polymeric supports have been used as a means of attaching metallocene catalysts to the support. In U.S. Pat. No. 5,492,985, a polymer bound cyclopentadienyl ligand is reacted with a metallated polystyrene to obtain a polymer bound metallocene catalyst useful for olefin polymerizations. In a similar approach, metallocene catalysts tethered to a copolymer support, are disclosed in U.S. Pat. No. 5,587,439. U.S. Pat. No. 4,921,825 discloses a process for forming a solid catalyst by reacting a metallocene, such as bis(cyclopentadienyl)zirconium dichloride, with an aluminoxane in the presence of a particulate organic or inorganic carrier. Similarly, the reaction product of a metallocene with an aluminoxane or a microporous polymeric support is disclosed in EP 563917-A1. In all of the foregoing, the metallocene is either reacted with the support via functionality present on the support material or the metallocene compound is reacted with an aluminoxane. Moreover, none of the references disclose the use of heterometallocenes.

SUMMARY OF THE INVENTION

The invention relates to supported heterometallocene catalysts comprising a particulate ethylene homopolymer or ethylene-$C_{3-8}$ α-olefin copolymer support, a transition metal coordination complex containing at least one anionic, polymerizationstable heteroatomic ligand and a boron activator compound. More specifically, the catalysts of the invention which are useful for the homopolymerization and copolymerization of olefins utilize a transition metal compound of the formula $$(L^*)_n(L)_mM(X)_y$$

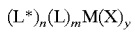

wherein M is a Group 3–10 metal, L* is an anionic, polymerization-stable heteroatomic ligand, L is a carbocylic or constrain-inducing ligand or L*, X is hydrogen, halogen, hydrocarbyl, alkoxy, siloxy or dialkylamido, n is 1 to 4, m is 0 to 3, y is 1 to 4 and n+m+y is equal to the valence of the transition metal M and a boron activator compound. Tripentafluorophenyl N,N-dimethylanilinium tetra(pentafluorophenyl) borate and trityl tetrakis(pentafluorophenyl)borate are particularly useful boron activators. Homopolymers and copolymers of ethylene are useful support materials particularly wherein the particles are spheroidal or substantially spheroidal. The polymer supports have melt indexes from 0.1 to 400 g/10 min and median particle sizes from 0.5 to 1000 microns. A process for polymerizing α-olefins using the catalysts of the invention is also described.

DETAILED DESCRIPTION OF THE INVENTION

Catalysts of the invention are supported heterometallocenes and comprise a transition metal coordination complex having at least one anionic, polymerization-stable heteroatomic ligand, a boron compound activator and a particulate polymeric support. Polymeric supports of the invention are polyethylene homopolymers and copolymers.

The term heterometallocene as used herein refers to single-site catalysts having at least one anionic, polymerization-stable heteroatomic ligand associated with the transition metal. Polymerization-stable ligands are those which remain associated with the transition metal under polymerization conditions. The transition metal complex may also contain other anionic, polymerization-stable ligands, such as Cp or Cp derivative ligands, constrain-inducing ligands as well as other groups such as hydrocarbyl, halogen and the like.

Transition-metal coordination complexes used for the preparation of the supported heterometallocene catalysts of the invention correspond to the formula:

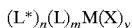

$$(L^*)_n(L)_m M(X)_y$$

wherein M is a Group 3–10 metal, L* is an anionic, polymerization-stable heteroatomic ligand, L is a carbocylic or constrain-inducing ligand or L*, X is hydrogen, halogen, hydrocarbyl, alkoxy, siloxy or dialkylamido, n is 1 to 4, m is 0 to 3, y is 1 to 4 and n+m+y is equal to the valence of the transition metal M. Preferably, the transition metal will be a Group 4, 5 or 6 metal and it is especially useful when the metal is a Group 4 metal, particularly, titanium, zirconium or hafnium. X is preferably halogen or hydrocarbyl. L is preferably another heteroatomic ligand, which can be the same or different, Cp or a Cp derivative.

It is particularly advantageous when L* is a heteroaromatic ligand selected from the group consisting of substituted and unsubstituted boraaryl, pyrrolyl, azaborolinyl, quinolinyl and pyridinyl ligands. Such heteroaromatic ligands are described in U.S. Pat. Nos. 5,554,775, 5,539,124, 5,637,660 and PCT International Application WO 96/34021, the teachings of which are incorporated herein by reference. The aforementioned heterocyclic ring systems may be part of a larger fused ring structure.

Carbocyclic ligands from which L is selected include substituted and unsubstituted Cp and Cp derivative ligands wherein the Cp ring is part of a fused ring structure, such as indenyl, 2-methylindenyl, tetrahydroindenyl, fluorenyl and the like. Polymerization-stable anionic ligands of this type are described in U.S. Pat. Nos. 4,791,180 and 4,752,597 which are incorporated herein by reference. Additionally, L can be a constrain-inducing ligand such as described in U.S. Pat. No. 5,272,536 which is incorporated herein by reference.

The L* and L ligands can be bridged. Bridging can be between the same or different ligand types. For example, a Cp ligand may be bridged to another Cp or to a heteroatomic ligand, such as a boraaryl moiety, through a bivalent bridging group such as an alkylene, phenylene, silyl, phosphorus-containing groups, boron-containing groups and oxygen-containing groups. Exemplary groups within the above classes of bridging moieties are methylene, ethylene, phenylene, dialkylsilyl, diarylalkyl or their substituted versions and the like. By bridging it is possible to change the geometry around the transition metal and thereby modify catalyst activity, comonomer incorporation and polymer properties.

In one highly useful embodiment of the invention, the transition metal complex is a complex of titanium, zirconium or hafnium, L* is selected from the group consisting of substituted and unsubstituted boraaryl, pyrrolyl, azaborolinyl, quinolinyl and pyridinyl ligands, n is 1 or 2, m is 0 or 1, L is an alkyl substituted or unsubstituted Cp or Cp derivative and X is selected from the group consisting of bromine, chlorine, $C_{1-4}$ alkyl, phenyl, alkyl substituted phenyl, benzyl or alkyl substituted benzyl.

A boron activator compound is employed with the transition metal complex to form the polymer supported catalysts of the invention. Known activator compounds capable of converting, i.e., ionizing, the transition metal complex to the active cationic catalyst species can be used for this purpose. Suitable activators are described in U.S. Pat. Nos. 5,153,157; 5,198,401 and 5,241,025, all of which are incorporated herein by reference, and include trialkyl and triaryl (substituted and unsubstituted) boranes, e.g., tripentafluorophenyl borane, and, more typically, ionic compounds, such as organoborates. Highly useful organoborate ionizing agents include N,N-dimethylanilinium tetra (pentafluorophenyl)borate and trityl tetrakis (pentafluorophenyl) borate which are particularly useful for the preferred catalysts of the invention.

Polymeric materials used as supports for the catalysts of the invention are homopolymers of ethylene and copolymers of ethylene and $C_{3-8}$ α-olefins, collectively referred to herein as polyethylenes. When a copolymer is employed, it will most generally be a copolymer of ethylene with propylene, butene-1, hexene-1 or octene-1.

The polyethylene supports can have melt indexes ranging from about 0.1 up to about 400 g/10 min. or above. However, in a preferred embodiment where the supports are microfine polyethylene powders comprised of particles which are spheroidal or substantially spheroidal, the melt index is in the range of from about 1 up to about 125, and, more preferably, from about 1 up to about 60. All melt indexes referred to herein are determined at 190° C. in accordance with ASTM D 1238, condition E, and are expressed in grams per 10 minutes (g/10 min).

The polymeric supports of the present invention are particulate products comprised of discrete particles wherein the particles have a median size from 0.5 up to about 1000 microns, and more preferably, from about 5 to about 500 microns. The polymeric powders can be obtained by spray drying or by precipitating from solution by the addition of suitable precipitating agents, e.g., methanol. The supports may also be produced by grinding or milling the polyethylene to produce powders within the acceptable size range. Mechanical grinding may be carried out under ambient conditions if the polymer has a sufficiently high melting point and does not degrade under the grinding conditions; however, it is more customary to cryogenically grind. Dry polymeric powders can be sieved to recover particles of the desired size and particle size distribution. Wet grinding techniques wherein the polyethylene is co-milled with an inert liquid, such as heptane, at ambient temperature or below can also be used. Suspensions of polymer particles in organic liquid mediums produced in this way may be directly used in subsequent catalyst preparation steps. A combination of these procedures can be used In a particularly useful embodiment of the invention, the particulate polyethylene supports are "microfine" powders obtained by dispersion processes. Spheroidal or substantially spheroidal supports can be produced in this manner and, in some instances, have been advantageously utilized to control polymer morphology. Microfine powders produced using dispersion processes can also have substantially narrower particle size distributions than powders produced by precipitation, grinding or milling.

Preferred polyethylene supports for the catalysts of the invention are comprised of discrete spheroidal or substantially spheroidal particles of median particle size from about 5 microns to about 300 microns. Particle sizes referred to herein are median diameters obtained from the particle volume distribution curves. Polyethylene powders of this type are conveniently produced using the dispersion techniques described in U.S. Pat. Nos. 3,422,049, 3,432,483 and 3,746,681, details of which are incorporated herein by reference. In these powder-forming dispersion processes, the polyethylene is charged to the reactor with a polar liquid medium and nonionic surfactant and a dispersion is formed in accordance with conventional dispersing procedures described in the art.

The dispersing apparatus may be any device capable of delivering sufficient shearing action to the mixture at elevated temperature and pressure. Conventional propeller stirrers designed to impart high shear can be used for this purpose. The vessel may also be equipped with baffles to assist in dispersing the copolymer. Particle size and particle size distribution will vary depending on the shearing action which, in turn, is related to the stirrer design and rate of stirring. Agitation rates can vary over wide limits.

The dispersion process is typically carried out in a vessel which enables the powder-forming process to be conducted at elevated temperature and pressure. In the usual batch process, all of the ingredients are charged to the vessel and the mixture is heated to a temperature above the melt point of the copolymer. While the temperature will vary depending on the specific polymer being used, it will typically range from about 175° C. to about 250° C. Since the fluidity of the dispersion is temperature dependent, it may be useful to carry out the process at temperatures substantially above the melting point of the polymeric blend to facilitate formation of the dispersion; however, the temperature should not exceed the thermal degradation temperature of the polymer.

Stirring is commenced after the desired temperature is reached and continued until a dispersion of the desired droplet size is produced. This will vary depending on the particular ethylene homopolymer or copolymer being used, temperature, amount and type of surfactant, and other process variables.

A polar liquid medium which is not a solvent for the polyethylene is employed as the dispersant for the formation of these microfine powder supports. These polar media are hydroxylic compounds and can include water, alcohols, polyols and mixtures thereof. It is particularly advantageous to use water as the dispersing medium or a liquid medium where water is the major component.

The pressure of the process is not critical so long as a liquid phase is maintained. In general, the pressure can range from about 1 up to about 250 atmospheres. The process can be conducted at autogenous pressure or the pressure can be adjusted to exceed the vapor pressure of the liquid medium at the operating temperature.

To form acceptable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to about 50 percent, based on the weight of the copolymer.

Useful nonionic surface active agents of the above type are manufactured and sold by BASF Corporation, Chemicals Division under the trademark Pluronic. These products are obtained by polymerizing ethylene oxide onto the ends of a preformed polyoxypropylic base. A wide variety of products of this type wherein the molecular weight of the polyoxypropylene base and the polyoxyethylene segments is varied are available. It is also possible to employ products sold under the trademark Tetronic which are prepared by building propylene oxide block copolymer chains onto an ethylenediamine nucleus and then polymerizing with ethylene oxide.

Powder-forming dispersion processes may also be conducted in a continuous manner. If continuous operation is employed, the ingredients are continuously introduced to the system while removing the dispersion from another part of the system. The ingredients may be separately charged or may be combined for introduction to the autoclave.

Contact of the transition metal complex and boron activator with the particulate polyethylene support is generally carried out by dissolving or slurrying the transition metal compound and boron activator compound in a hydrocarbon and contacting with the support material. Separate hydrocarbon solutions/slurries may be used or both components may be included in the same solution/slurry. Conventional inert aliphatic and aromatic hydrocarbons can be employed for this purpose. These include hydrocarbons such as isobutane, pentane, hexane, heptane, toluene and the like. Mixtures of hydrocarbons may also be employed.

After contacting the solution or slurries of the transition metal complex and boron activator with the support for some contact period, the hydrocarbon is usually removed under vacuum or by other known means. The supported catalyst may be washed prior to use and, if desired, resuspended in fresh hydrocarbon. The supported heterometallocene catalysts may be introduced to the polymerization system either in dry form or in a hydrocarbon medium as a slurry or suspension. Catalysts prepared in this manner exhibit good shelf-life stability and may be stored for extended periods in a dry box or the like without significant decrease in activity.

The amount of transition metal complex and boron activator compound used is adjusted so that the molar ratio of boron to transition metal ranges from about 0.1:1 to 10:1 and, more preferably, from 1:1 to 3:1. Supported heterometallocene catalysts exhibiting high activity with little or no propensity for reactor fouling or sheeting are obtained using substantially equimolar amounts, based on the metals, of the transition metal complex and ionizing agent up to 1.5:1 (B:transition metal). The catalysts will generally have from 0.001 to 0.5 mmole transition metal per gram of support. More commonly, the support will have from 0.01 to 0.25 mmole transition metal per gram deposited thereon.

While it is not necessary, the polyethylene supports can be pretreated prior to deposition of the transition metal complex and boron activator compound. Such pretreatment can be thermal or chemical in nature or a combination of such treatments can be used. It may also include one or more wash steps to remove water, surfactants or other impurities. Any thermal pretreatment must necessarily be at moderate temperatures so as not to cause thermal degradation of the polymeric support. Also, the heating must be below the softening point of the polymer so that the polymer particles do not become sticky and fuse together.

Chemically pretreating the support prior to deposition of the transition metal complex and boron activator may be accomplished in either the liquid or vapor phase. In the liquid phase, the chemical-treating agent is applied to the support as a liquid, either by itself or, more preferably, as a solution in a suitable hydrocarbon solvent such as a hexane. In the vapor phase, the modifier is contacted with the support in the form of a gas. Suitable compounds for pretreating the polyolefin support can include alumoxanes, alkyl aluminums, alkyl aluminum halides, alkyl aluminum hydrides, alkylsilyl halides, alkyldisilazanes, alkyl and aryl alkoxysilanes, and alkyl, aryl, and alkoxy boron compounds. Specific compounds of the above types include: (poly) methylalumoxane (MAO), trimethylaluminum, triethylaluminum, tripropylaluminum, triisobutylaluminum, diethylaluminum chloride, diisobutylaluminum hydride, ethylaluminum dichloride, trimethylchlorosilane, dimethyldichlorosilane, hexamethyldisilazane, cyclohexylmethyldi methoxysi lane, methyltri methoxysi lane, trimethylboron, triethylboron, tripropylboron, triisobutylboron, trimethoxyboron, triethoxyboron, triphenoxyboron and the like.

The supported heterometallocene catalysts of the invention are useful for the polymerization of α-olefins in accordance with known polymerization procedures. Most commonly they are employed in conjunction with a co-catalyst, most typically, an organometallic compound of a Group 2 or 3 metal containing at least one alkyl group having from 1 to 8 carbon atoms. Organometallic alkylating agents which can be used as co-catalysts include dialkyl zincs, dialkyl magnesiums, alkyl magnesium halides, alkyl aluminum dihalides, dialkyl aluminum halides, trialkyl aluminums and alkylalumoxanes. Preferably, aluminum alkyls are employed which can include compounds such as MAO, trimethylaluminum, triethylaluminum, tripropylaluminum, triisopropylaluminum, tributylaluminum, triisobutylaluminum, tripentylaluminum, trihexylaluminum, triheptylaluminum, trioctylaluminum, diethylaluminum hydride, diisopropylaluminum hydride, diisobutylaluminum hydride, diethylaluminum chloride, dipropylaluminum chloride, diisopropylaluminum chloride, diisobutylaluminum chloride, diethylaluminum ethoxide, diisopropylaluminum isopropoxide, ethylaluminum sesquichloride, isopropylaluminum sesquichloride, isobutylaluminum sesquichloride, ethylaluminum dichloride, isopropylaluminum dichloride, isobutylaluminum dichloride and ethylaluminum diisopropoxide. Aluminum trialkyls are especially useful particularly if the alkyl groups contain from 1 to 4 carbon atoms.

The catalysts of the invention are advantageously used for the preparation of any of the commonly known polyolefin resins using varied polymerization procedures and monomers. They are suitable for use in batch, continuous or semi-continuous operations using single or multiple reactors for homopolymerizing and copolymerizing $C_{2-12}$ olefins. Most commonly, they are used to polymerize $C_{2-8}$ α-olefins in the liquid or gas phases at pressures from 15 psi to 45,000 psi and temperatures from 50° C. up to about 300° C. Preferred monomers for such polymerizations are ethylene, propylene, butene-1, hexene-1, octene-1 and mixtures thereof.

The following examples illustrate the practice of the invention and are representative of various embodiments described and claimed herein. They are not intended as a limitation on the scope of the invention and variations/modification will be apparent to those skilled in the art.

For the examples, all materials used were thoroughly dried prior to use and the customary precautions taken to exclude air and moisture during catalyst preparation and polymerization. Polymer densities were determined according to ASTM D-1505. The melt index (MI) of the polymers was measured according to ASTM D-1238, Condition E, using a 2.16 kg weight. Catalyst activity is the number of grams of polymer produced per gram of transition metal per hour.

EXAMPLE 1

A polyethylene supported heterometallocene catalyst of the invention was prepared as follows: A flask was charged with 1.12 g of small particle size polyethylene powder (MICROTHENE FN 510 polyolefin powder; melt index 5; density 0.923; median particle size 20 microns), 0.032 g cyclopentadienyl(1-methylboratabenzene)zirconium dichloride (0.10 mmol), 0.122 g trityl tetrakis(pentafluorophenyl)borate (0.13 mol) and toluene (10 ml). The mixture was stirred for one hour and the resulting slurry dried under vacuum to remove the solvent and recover the supported catalyst.

The supported heterometallocene catalyst was used to polymerize ethylene. The polymerization was performed in a two-liter, stainless steel autoclave. Hydrogen (4 mmoles) was introduced into the reactor from a 50-ml vessel. The amount added was determined by measuring the pressure drop in the vessel. Triethylaluminum (0.75 mmoles; 0.3 ml of 1.5 M solution in heptane) was then added to the reactor with isobutane (about 800 ml) and the temperature allowed to equilibrate to 75° C. Ethylene was next added to the reactor (to 400 psig) followed by the addition of a mixture of the supported heterometallocene catalyst (0.021 g) and 0.2 ml of the triethylaluminum solution. The polymerization was conducted for approximately one hour while maintaining the temperature at 75° C. Ethylene was fed throughout the polymerization to maintain the reactor pressure. At the conclusion of the polymerization run, the autoclave was vented and the solid polymer recovered. 124.3 Grams of a ZMI polyethylene were recovered. The calculated catalyst activity was 11833 g/gZr/hr. There was no evidence of reactor fouling, i.e., no polymer was adhered to the walls of the autoclave or the agitator shaft or blades.

COMPARATIVE EXAMPLE A

To demonstrate the superior results obtained with polymer supported heterometallocene catalysts of the invention, an identically supported catalyst was prepared using a well-known metallocene catalyst, biscylopentadienylzirconium dichloride. The comparative catalyst was prepared by charging 1.15 g of the particulate LDPE support of Example 1, 0.033 g biscyclopentadienylzirconium dichloride (0.13 mmol) and 0.115 g trityl tetrakis(pentafluorophenyl)borate (0.13 mmol) to the flask. A slurry of the solids was prepared in toluene (10 ml). The mixture was stirred for one hour and the polyethylene supported metallocene catalyst recovered by removing the solvent under vacuum.

Following the polymerization procedure described in Example 1, the comparative catalyst prepared above was evaluated for its ability to polymerize ethylene. Only 15.2 grams polyethylene were produced with the polymer supported metallocene catalyst. The activity was only 586 g/gZr/hr.

COMPARATIVE EXAMPLE B

Another attempt was made to use a polymer supported metallocene catalyst, however, in this case an alumoxane modifier was substituted for the boron activator compound. Alumoxanes are well-known and widely used modifiers for metallocene catalysts. The supported catalyst was prepared by charging 1.35 g of the particulate LDPE of Example 1 and 0.034 g biscyclopentadienylzirconium dichloride (0.13 mmol/g $SiO_2$) to a flask with toluene (10 ml). The mixture was stirred and 5 ml polymethylalumoxane (7 weight percent Al) was added to the slurry. Stirring was continued for one hour and the supported catalyst recovered in the usual manner. This catalyst had no activity when evaluated using the polymerization procedure of Example 1. No polymer was formed after one hour in the polymerizer.

EXAMPLE 2

To demonstrate the versatility of the polymer supported heterometallocene catalyst, the catalyst of Example 1 was used to copolymerize ethylene and butene-1. The copolymerization was conducted insthe same manner as describe in Example 1 except that no hydrogen was used and 10 mol butene-1 was included in the polymerizer with the ethylene. Catalyst activity was 6914 g/gZr/hr and no reactor fouling was observed.

We claim:

1. A process which comprises polymerizing an olefin in the presence of a supported catalyst, said catalyst comprising:
   (a) a particulate ethylene homopolymer or ethylene-$C_{3-8}$ α-olefin copolymer support;
   (b) a transition metal coordination complex containing at least one six-membered boraaryl ligand; and
   (c) a boron activator compound.

2. A process which comprises polymerizing an olefin in the presence of a supported catalyst, said catalyst comprising:
   (a) a particulate ethylene homopolymer or ethylene-$C_{3-8}$ α-olefin copolymer support having a median particle size of 0.5 to 1000 microns and a melt index, measured according to ASTM D-1238, Condition E, using a 2.16 kg weight, of from 0.1 to 400 g/10 min;
   (b) a transition metal coordination complex having the formula $(L^*)_n(L)_m M(X)_y$ in which M is a Group 3–10 metal, $L^*$ is six-membered boraaryl, L is a carbocyclic or constrain-inducing ligand or $L^*$, X is hydrogen, halogen, hydrocarbyl, alkoxy, siloxy, or dialkylamido, n is 1 or 2, m is 0 to 3, y is 1 to 4, and n+m+y is equal to the valence of M; and
   (c) a boron activator compound selected from the group consisting of tri(pentafluorophenyl)borane, N,N-dimethylanilinium tetrakis(pentafluorophenyl)borate, and trityl tetrakis(pentafluorophenyl)borate;
   wherein the supported catalyst contains from 0.001 to 0.5 mmoles of transition metal per gram of support; and
   wherein the molar ratio of boron to transition metal is 0.1:1 to 10:1.

3. The process of claim 2 wherein the olefin is ethylene or a mixture of ethylene and a $C_{3-8}$ α-olefin.

4. The process of claim 3 conducted in the liquid base with a co-catalyst which is an organometallic compound of a Group 2 or 3 metal having at least none alkyl group containing from 1 to 8 carbon atoms.

5. The process of claim 3 conducted in the gas phase with a co-catalyst which is an organometallic compound of a Group 2 or 3 metal having at least one alkyl group containing from 1 to 8 carbon atoms.

* * * * *